E. W. GOODRICH.
SLIDE CARRIER FOR PROJECTION APPARATUS.
APPLICATION FILED FEB. 23, 1909.
1,035,872.
Patented Aug. 20, 1912.
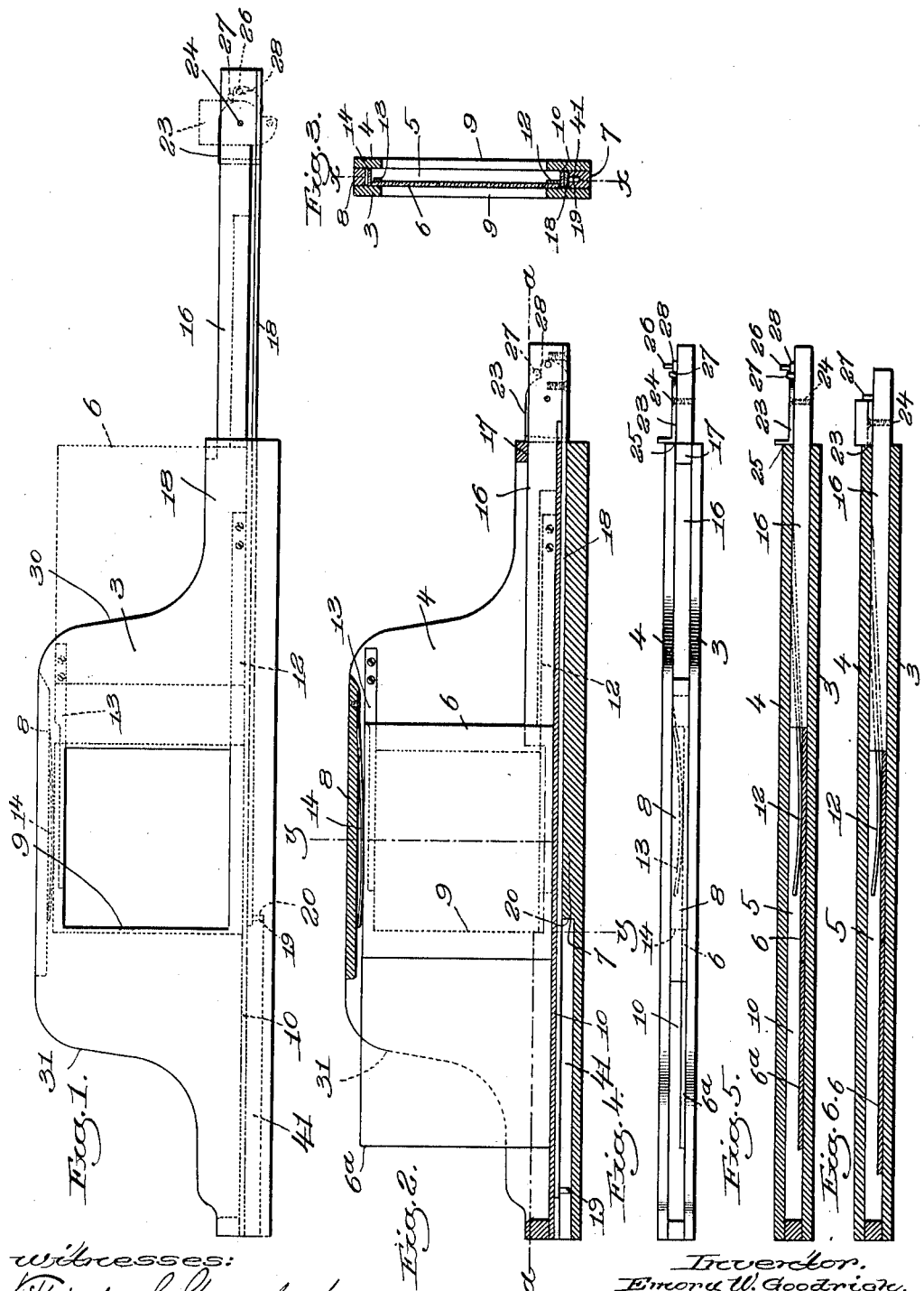

UNITED STATES PATENT OFFICE.

EMORY W. GOODRICH, OF SOMERVILLE, MASSACHUSETTS.

SLIDE-CARRIER FOR PROJECTION APPARATUS.

1,035,872.  Specification of Letters Patent.  Patented Aug. 20, 1912.

Application filed February 23, 1909. Serial No. 479,590.

*To all whom it may concern:*

Be it known that I, EMORY W. GOODRICH, a citizen of the United States, residing at Somerville, county of Middlesex, and State of Massachusetts, have invented an Improvement in Slide-Carriers for Projection Apparatus, of which the following description, in connection with the accompanying drawing, is a specification, like letters on the drawing representing like parts.

This invention relates to slide carriers such as are used for holding slides or transparencies in a projection apparatus.

The slide carrier which is now commonly employed is in the form of a frame in which is slidably mounted a holder provided with two slide-receiving pockets and adapted to slide back and forth in the frame to bring either pocket in alinement with the aperture through the frame. The holders above referred to are usually adapted to contain one size only of slide or transparency and if at any time during the use of a projection apparatus it is necessary or desirable to exhibit slides or transparencies of different sizes, it is necessary to remove entirely the holder and substitute therefor another holder having pockets of the correct size to receive the desired transparency. It is a fact that the standard size of transparencies or slides as made in the United States is three and one quarter by four inches, while the standard size of transparencies as made in England and some other countries is three and a half inches square, and an exhibitor very frequently desires to use in the course of an exhibition some slides of one size and some slides of another size. As stated above, this cannot be done when the holder above referred to is used without removing one holder and substituting therefor another. Moreover in using a slide carrier of the type above referred to the slides and transparencies are inserted and removed from the holder alternately from opposite sides and the operation of inserting the slide into the holder on the opposite side from the operator involves reaching over the lamp and is sometimes a rather difficult operation.

The objects of my invention are to provide a novel slide carrier in which slides of a variety of sizes can be used without changing any of the parts and which permits all of the slides to be inserted into the carrier from the side adjacent the operator, and which is so constructed that slides of different sizes and thicknesses will all be properly centered and positioned in the carrier.

Other objects of my invention will be more fully hereinafter described and then pointed out in the appended claims.

Referring to the drawings, Figure 1 is a front elevation of a slide carrier embodying the invention; Fig. 2 is a vertical section on substantially the line $x—x$, Fig. 3; Fig. 3 is a section on substantially the line $y—y$, Fig. 2; Fig. 4 is a top plan view; Fig. 5 is a section on the line $a—a$, Fig. 2; Fig. 6 is also a section on the line $a—a$, Fig. 2, showing the positioning device when used for positioning a smaller size of slide or transparency from that shown in Fig. 5.

My improved slide carrier comprises two side pieces 3 and 4 forming between them a slide-receiving pocket 5 for receiving the slides or transparencies 6. These two sides 3 and 4 are extended at their lower edges and are secured at said edges to a base piece 7 which is herein shown as in the form of a filling piece inserted between the sides at their lower edges. The upper edges of the sides 3 and 4 are also properly spaced by a filling piece 8 to which they are connected. The space between the sides 3 and 4 is open at each end of the device to permit of the insertion of transparencies into the pocket 5 between the sides and to permit of their removal therefrom. The two sides 3 and 4 are each provided with an opening 9 through which the beam of light from the projection apparatus is projected, and when the transparencies are properly positioned they stand in line with this opening. I prefer to place a strip of brass 10 or some similar metal immediately over the base piece 7 so as to form a surface on which the transparency 6 may rest.

Owing to the shape of the sides 3 and 4 the brass strip 10 on which the slides rest projects beyond the upper edge of the sides at each end thereof. The slides or transparencies 6 are inserted into the pocket 5 by placing them in the dotted line position in Fig. 1, in which position the inner edge of the transparency is received in the edge of the pocket, but the corner of the transparency projects beyond the edge 30 of the holder.

In using the device the transparency is pushed into the pocket 5 into alinement with the opening 9, and while said transparency is being exhibited the next transparency is inserted into the edge of the pocket as above described. When this last transparency is pushed into position to be exhibited, the former transparency will be carried partially out of the pocket on the other side, as shown by the transparency 6ᵃ in Fig. 2, in which position one corner of said transparency is exposed beyond the edge 31 of the slide carrier so that said transparency can be readily removed from the device. This movement of the transparencies into and through the pocket 5 is accomplished by means of a positioning device 16 which is herein shown as a slide adapted to move back and forth in the bottom of the pocket 5. This slide rests on the brass strip 10 and extends through an opening in the end wall 17 of the slide carrier. The positioning device also has associated therewith a strip of metal 18 which passes underneath the strip 10 and which serves to prevent the positioning device from tilting upwardly. This strip 18 is provided on its end with a stop finger 19 which plays in a groove 41 formed in the base piece 7. Said groove terminates at 20 in a shoulder which by engagement with the stop finger 19 limits the outward movement of the position device, as shown in Fig. 1. When the positioning device is withdrawn, a slide or transparency may be inserted into the pocket 5 in front thereof, and by pushing the positioning device inwardly, this transparency will be carried into position in alinement with the aperture 9.

As stated above the standard size of transparencies commonly made and used here in America is three and one quarter by four inches, while the common size of transparencies made in England and some other countries is three and one half inches square. In order to permit transparencies of both sizes to be used without making any change in the parts of the apparatus, I have provided means whereby the positioning device above referred to may be used to accurately position slides of different sizes. This is accomplished by associating with the positioning device a stop member which is adapted to prevent further inward movement of said positioning device when the transparency is properly positioned. This stop member is so arranged that it will limit the inward movement of the positioning device so as to properly position the transparencies of different sizes. As herein shown, said stop member is in the form of a plate 23 which is pivoted to the positioning device 16 on one side thereof, as at 24. Since said plate is situated on the side of the positioning device, it will be brought up against the end 25 of the side piece 4 when the positioning device is moved inwardly thereby to limit inward movement of said positioning device. The stop member 23 has such a shape that when it is in the position shown in full lines in the drawings, it will prevent the positioning device from moving inwardly as far as will be possible when said stop member is in the dotted line position Fig. 1. The stop member is provided with a projection 26 by which the operator may easily turn it from the full to the dotted line position Fig. 1 and it is held in the full line position by a pin 27 carried by the positioning device and with which the portion 28 of the stop member is adapted to engage. When it is desired to use the large sized transparency, that is, transparencies three and one quarter by four inches, the stop member is placed in the full line position Fig. 1, in which case inward movement of the positioning device will bring the transparency to rest in a position properly alined with the opening 9. When a transparency of a smaller size is to be used, the stop member is turned into the dotted line position Fig. 1 and full line position Fig. 6, which permits the positioning device 16 to be moved inwardly a greater distance than is possible when the stop member is in the full line position Fig. 5, and a distance sufficient to properly position the small size of slide. The pocket 5 is wide enough to receive transparencies of different widths and I have purposely made it this way because some transparencies are made thicker than others.

In using the device it is desirable that when the transparencies are situated opposite the apertures 9 they should always be located in the same plane, for otherwise an adjustment of the focus of the projection apparatus might be necessary each time that a new transparency was exhibited. I have accordingly provided means whereby whenever a transparency is placed in position it will be held firmly against the inside face of the side 3 regardless of the thickness of the transparency. This is accomplished herein by providing at the top and bottom of the pocket 5 springs or equivalent devices which yieldingly press against the rear face of the transparency and force it against the inner face of the side piece 3. These springs are designated 12 and 13, respectively, and they are shown as leaf springs fastened at one end to the side 4 of the device and bent so as to be engaged by the transparency as it is inserted from the right-hand side of the device. It will be readily seen that said springs will hold the transparency against the side 3 and therefore such transparency will occupy the same vertical plane and no adjustment of the focus of the projection apparatus will be required for different transparencies. It is also desirable that the transparency should always be held firmly against the metal strip 10 regardless of the size of the transparency, and I have accordingly provided a spring 14 which is situated within the pocket 5 and is secured to the spacing block 8, which spring acts on the top edge of the transparency and holds it in proper position.

From the above it will be seen that my slide carrier is very simple in construction and is also extremely easy to operate, for the slides are always put in on the same side and are removed from the opposite side, and the change from a slide of one size to a slide of another size involves merely a shifting of the stop member 23.

While I have illustrated herein one embodiment of my invention, I do not wish to be limited to the construction shown.

Having fully described my invention, what I claim as new and desire to secure by Letters Patent is:—

1. In a slide carrier, the combination with two apertured side pieces spaced from each other to form between them a slide-receiving pocket which is open at one end of the carrier for the reception of a slide and at the other end for the removal of the slide and through which the slides can be moved, of a slidable positioning device located at the receiving end of the slide carrier and adapted to engage a slide placed in said receiving end and advance the slide into position opposite the apertures in the side pieces, and a stop member sustained by and movable with the positioning device and adapted to engage one of the side pieces thereby to limit the inward movement of said positioning device.

2. A slide carrier having an open passage extending from one end to the other and through which slides may be moved, a slidable slide-positioning device situated at the receiving end of said carrier and extending beyond the same and in front of which a slide may be placed, said positioning device being adapted by its sliding movement to engage said slide and push it into said passage thereby to position it and being withdrawable into its initial position without moving the positioned slide, and a stop carried by the slide-positioning device and situated to engage the carrier as the positioning device moves forward thereby to limit the positioning movement of said device.

3. In a slide carrier, the combination with two apertured side pieces spaced from each other to form between them a slide-receiving pocket which is open at both ends and through which slides may be moved, of a slidable slide-positioning device situated at the receiving end of the carrier and when in initial position extending beyond said end sufficiently to receive a slide in front of it whereby inward movement of the positioning device will carry the slide into said passage, said positioning device being withdrawable into its initial position without moving the positioned slide, and a stop carried by said positioning device and adapted to limit the inward movement thereof.

4. In a slide carrier, the combination with two side pieces spaced from each other to form a slide-receiving pocket which is open at both ends and a base piece connecting the side pieces and forming the bottom of the pocket, of a positioning device slidably mounted between said sides and adapted to position a slide in the pocket, said base piece having a channel extending longitudinally thereof and an arm secured to the positioning device and sliding in said channel, and a stop finger carried by said arm and adapted to limit the outward movement of the positioning device.

5. In a slide carrier, the combination with two side pieces spaced from each other to form a slide-receiving pocket which is open at both ends of the slide carrier so that the slides may be inserted at one end and forced through the passage and withdrawn from the other end thereof, of a slidable positioning device movable in said passage and situated at the receiving end of the carrier and when in initial position extending beyond said end sufficiently to permit a slide to be inserted in front thereof, inward movement of the carrier moving the slide into the passage, and a stop member pivoted to and carried by the projecting end of said positioning device and adapted to engage one of the side pieces thereby to limit the inward movement of the positioning device, said stop member being adjustable to bring the positioning device to rest at different points.

6. In a slide carrier, the combination with two apertured side pieces spaced from each other to form between them a slide-receiving pocket which is open at one end of the carrier for the reception of a slide and at the other end for the removal of the slide and through which the slides can be moved, of a slidable slide-positioning device located at and extending beyond the receiving end of the slide carrier and adapted to engage a slide in said receiving end and advance the slide into position opposite the apertures in the side pieces, said positioning device being movable backwardly independently of the slide, and means sustained by and movable with said positioning device and adapted to engage one of the side pieces thereby to limit the inward movement of said positioning device.

In testimony whereof, I have signed my name to this specification, in the presence of two subscribing witnesses.

EMORY W. GOODRICH.

Witnesses:
  LOUIS C. SMITH,
  THOMAS J. DRUMMOND.

Copies of this patent may be obtained for five cents each, by addressing the "Commissioner of Patents, Washington, D. C."